Feb. 9, 1937.   C. W. RICE   2,070,067
STEAM SCRUBBER
Filed Jan. 29, 1936   3 Sheets-Sheet 1
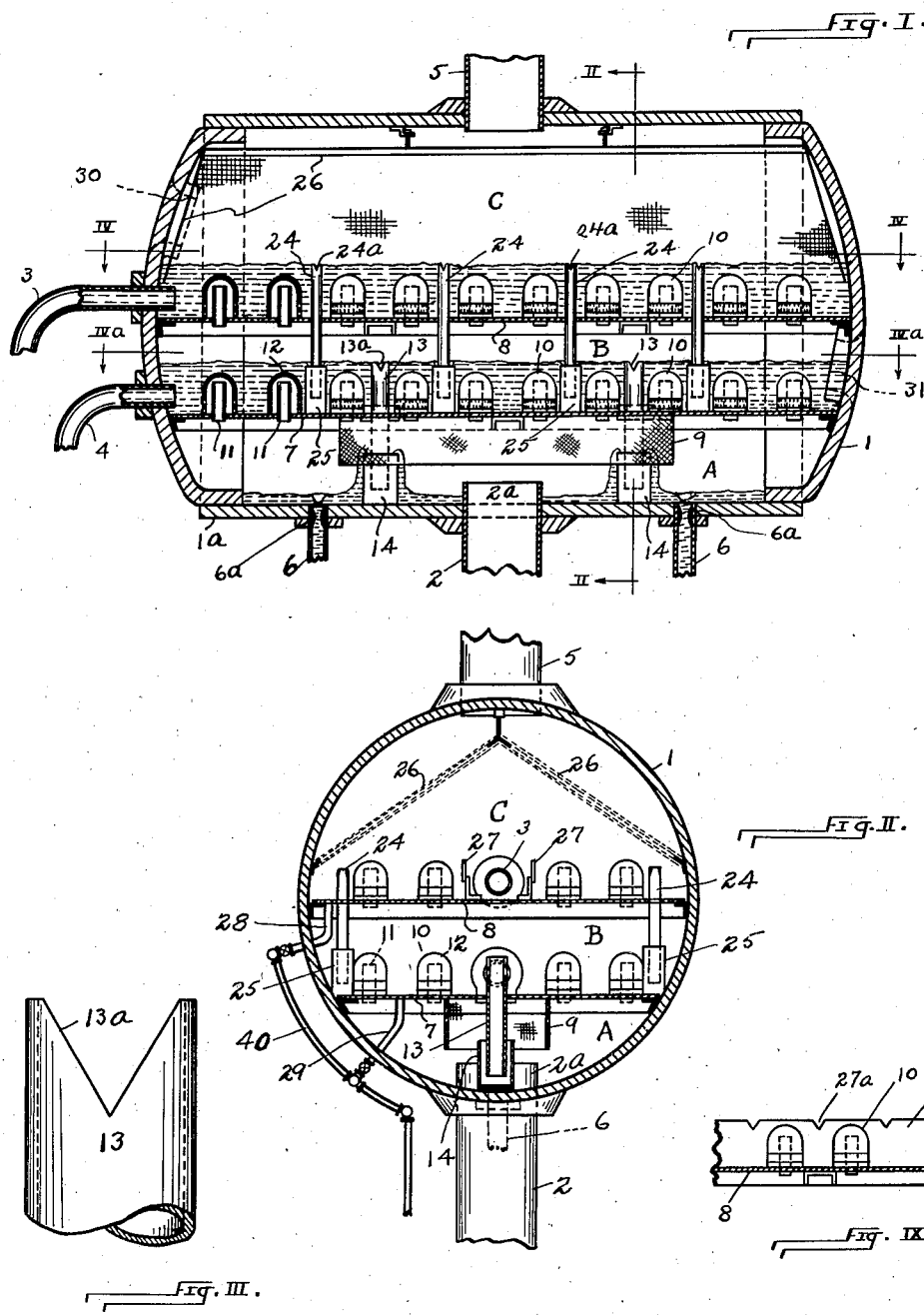
INVENTOR
Cyrus Wm. Rice
BY Christy and Wharton
ATTORNEYS

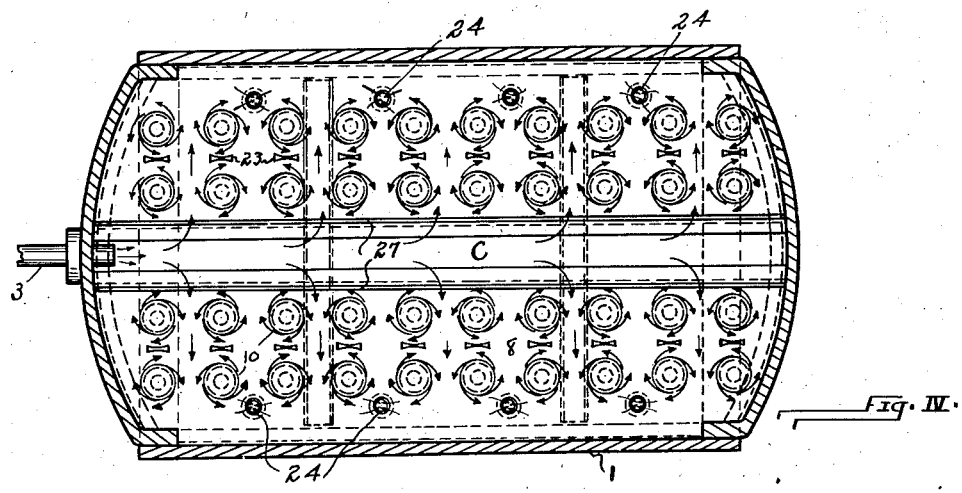
Fig. IV.
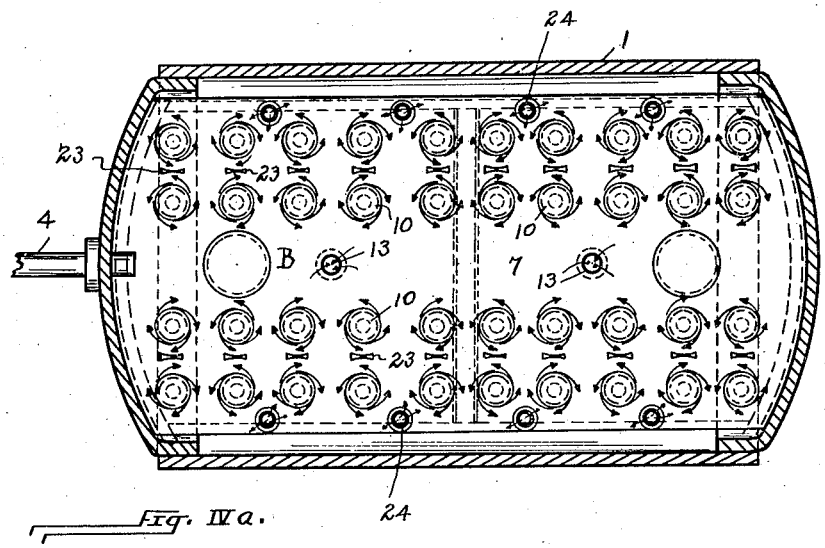
Fig. IVa.

Feb. 9, 1937. C. W. RICE 2,070,067
STEAM SCRUBBER
Filed Jan. 29, 1936 3 Sheets-Sheet 3
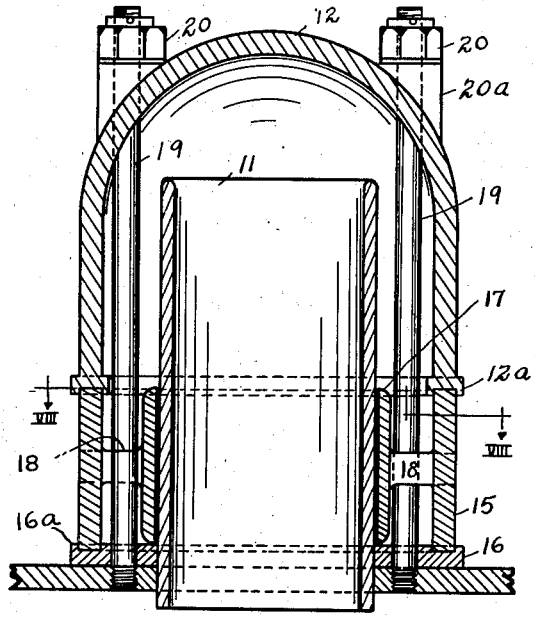
Fig. V.
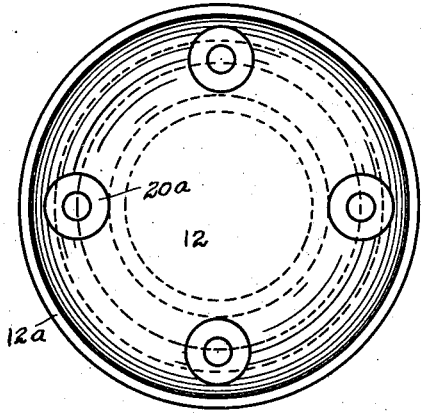
Fig. VI.
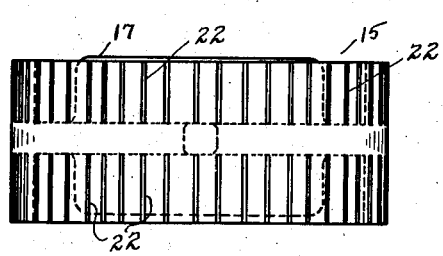
Fig. VII.
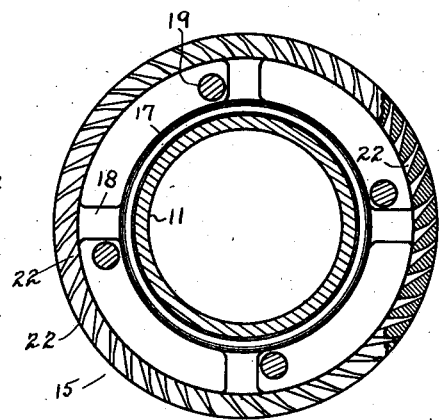
Fig. VIII.
INVENTOR
Cyrus Wm. Rice
BY Christy and Wharton
ATTORNEYS Patented Feb. 9, 1937

2,070,067

UNITED STATES PATENT OFFICE 2,070,067

STEAM SCRUBBER

Cyrus W. Rice, Pittsburgh, Pa.

Application January 29, 1936, Serial No. 61,397

15 Claims. (Cl. 261—114)

This invention relates to the scrubbing of steam.

In high rating and high pressure steam-generating installations, it is a matter of great importance that solids be to maximum extent removed from the steam, as any entrained solids work substantial injury to connections and equipment conveying or utilizing the steam. It being in practice impossible wholly to remove moisture from the steam, it becomes, in order to effect in substantial entirety removal of entrained solids, necessary that apparatus and procedure be supplied by which the moisture content of the steam which entrains the injurious solids is exchanged for a moisture content in which a minimized quantity of solids are contained.

In incorporating in a system, involving the generation, delivery, and utilization of steam, a scrubber structure capable of effecting substantial elimination of solids from the steam, there are certain requirements which are of primary importance. For example, the steam scrubber must be apparatus which is separate from the boiler itself; it must be so organized that the temperature of the steam is not greatly reduced in passage through it, and it must be so organized that the steam is brought into extremely intimate contact with water containing a preponderantly lower content of solids than does the steam to be washed.

Other features of substantial moment in a steam scrubber are to avoid contact of the steam with water containing a concentration of solids, to maintain a body of water adequate to wash the steam, to regulate the depth of water with which the steam is brought into contact substantially in accordance with steam flow, and to eliminate, so far as is possible, moisture from the steam in its passage through the scrubber.

Other features of importance in the efficient operation of a steam scrubber involving scrubbing baths of water are to maintain such circulation of water in the scrubber that a water hammer effect is avoided and turbulence in the bath water is minimized, to provide a scrubber which may be readily drained and readily inspected throughout, and to obtain the various advantages above noted by means of parts which are of a form and material peculiarly suited to their purpose, and which are readily replaceable when their utility has become impaired in service.

Another feature of importance is to maintain such circulation of bath water in a steam scrubber that localized concentrations of solids in the bath water is prevented, and such circulation of water in the scrubber that, as drawn from the scrubber to a boiler, the drawn off water maintains such approximate uniformity of temperature that it does not produce in the boiler temperature variations tending to strain the metal of the boiler.

Still another feature of importance is so to introduce into the scrubber the relatively cool boiler feed water, or water from another source which is used for scrubbing that it is commingled with warmer water before coming into contact with a wall of the scrubber; stresses in the scrubber walls, due to the temperature variations, being thus avoided.

The above and other objects are obtained in the steam scrubber of my invention.

Referring to the accompanying drawings Fig. I is a longitudinal, sectional, vertical view through my steam scrubber, showing the scrubber shell and certain of the steam distributing elements in section, and showing the remaining elements within the shell of the scrubber in elevation.

Fig. II is a cross-sectional view, taken on the plane of section line II—II, Fig. I.

Fig. III is a detail, fragmentary elevation of the inlet portion of one of the draw-off tubes for maintaining the water level in the steam washing compartments of the scrubber.

Fig. IV is a view in horizontal section, taken on the plane of the section line IV—IV, Fig. I.

Fig. IVa is a horizontal, sectional view through the steam scrubber, taken on the plane of section line IVa—IVa, Fig. I.

Fig. V is a detail view of one of the steam-distributing elements, taken in central, vertical section.

Fig. VI is a plan view of the steam-distributing unit.

Fig. VII is a detail elevational view of the ported ring through which steam is delivered from the distributing unit.

Fig. VIII is a cross-sectional view through the steam-distributing unit, taken on the plane of the section line VIII—VIII, Fig. V.

Fig. IX is a fragmentary, sectional view, showing in elevation and in detail several steam-distributing units, and illustrating particularly a channel-forming wall of the final steam scrubbing chamber of the apparatus, and the means for permitting issuance of water therepast.

In the drawings, reference numeral 1 designates the shell of the steam scrubber, to the interior of which leads a steam-supply duct 2 and water-supply ducts 3 and 4. A steam delivery duct 5 leads from the upper region of the space within the scrubber shell, and draw-off pipes 6 pass through the bottom plate 1a of the shell, to drain water from the lowermost shell region. Within the shell of the scrubber are two horizontally disposed partition walls or floors 7 and 8, which define within the shell of the scrubber a steam-receiving chamber A, an initial scrubbing chamber B, and a final scrubbing and steam-delivery chamber C.

Briefly described, the operation of washing steam in the scrubber is that steam is introduced by inlet duct 2 into steam-receiving space A, from which it passes through steam-distributing units into a bath of water contained in the initial scrubbing chamber B. From initial scrubbing chamber B the steam again passes through distributing units, and is distributed in a bath of water contained in final scrubbing chamber C. From the final scrubbing chamber C, steam passes by way of delivery duct 5 to a superheater, or directly to work. Water is supplied to the final scrubbing chamber C, this water being desirably boiler feed water comprising condensate, or water of high purity from some other source. Overflow from scrubbing chamber C is drawn off to provide the bath in scrubbing chamber B, and water from scrubbing chamber B is drawn off into steam-distributing space A, and thence to the boiler by way of drain-off pipes 6. Any slight temperature loss suffered by the steam in passing through the scrubber is in part compensated by corresponding increase in the temperature of the water drawn off from the scrubber to the boiler.

Turning now to the advantageous structural features of my steam scrubber, and to their functioning in the association which has been generally described, it will be seen that steam-inlet duct 2 has a regional projection 2a extended sufficiently above the inner surface of bottom plate 1a of the shell to prevent entry of water into the duct.

Referring particularly to Figs. I and II of the drawings, it will be seen that steam-supply duct 2 enters the shell or drum 1 at a point on both the transverse and longitudinal center lines of the drum. Upon entering, the steam impinges against a longitudinally extended imperforate region of the lower partition wall 7, in which region it is surrounded by a screen 9 of relatively fine mesh, dependent from the under surface of the wall 7. In spreading laterally through the screen 9 some of the moisture content of the steam, particularly that which is in the form of slugs of water, is detained and flows downwardly to the base of the drum.

As initially distributed or spread in steam-entry space A, the steam enters the steam-distributing units 10 by way of tubes 11, which pass through the wall 7, and which have their upper terminals lying within domes 12 of the steam-distributing units. From the steam-distributing units the steam is delivered in comminuted streams at the lowest level in a bath of water of substantial depth which lies upon the partition wall 7.

The level of the bath is maintained constant by means of a plurality of draw-off pipes 13, which extend an equal and predetermined distance above partition wall 7, and which project below the partition wall into steam-entry space A. At their lower terminals, draw-off pipes 13 lie within water seals 14 on the bottom of the drum, so that the water drawn back from this initial bath is received within these water seals, and is delivered for drainage by overflow around the edges of the water seals. The use of water seals 14 prevents the entry of steam into the draw-off tubes 13, and thereby causes the steam to follow its intended path through the scrubber.

At its upper terminal each of the draw-off tubes 13 is formed with diametrically opposed V-shaped notches 13a, so that restricted entry of water into the tubes is had at the lower region of the notches. During periods when the delivery of water to the system is but slight, draw-off occurs adjacent the points of the V notches. During periods when water is delivered in increased volume, however, the level of the bath water rises along the height of the notches, thus providing a bath of increased depth. This automatic regulation of bath depth is of importance, since in well organized steam-generating systems the supply of boiler feed water is directly correlated with steam delivery, so that delivery of an increased volume of steam causes water to be supplied in increased volume to the boiler. The notches 13a of the draw-off tubes 13 thus permit the depth of bath water to build up at times when increased steam delivery renders an increased bath depth desirable.

Returning to a discussion of the steam-distributing units 10, and considering specifically the structure of these units, it has been noted that the elivery tube 11 of the unit delivers steam beneath a dome 12 forming the upper portion of the unit. This dome is formed as a separate element, having at its lower edge a channeled rim 12a, which rests upon and embraces a ported ring 15. Ported ring 15 in turn seats upon a base plate 16, with which it has a machined fit. Peripheral bead 16a, embracing the lower terminal of the ring 15, provides a seal at the lower edge of the ring. Inlet tube 11 is shown as embraced by a ring or band 17 connected concentrically with the ported ring 15 by radial arms 18. The entire assembly of the steam-distributing unit is mounted on the partition wall 7 by means of through bolts 19, which have a threaded engagement with the partition wall at their lower terminals, and which at their upper terminals carry nuts 20 arranged to bear against bosses 20a on the outer surface of the dome 12.

When steam enters a distributing unit, by way of inlet tube 11, it passes downwardly in dome 12 into the region, at the base of the unit, in which it finds egress from the unit by way of the ported ring 15. As the form of ported ring 15 is a feature of primary importance in the structure of the distributing units, and in the functioning of the steam scrubber considered as a whole, it will be here given detailed description.

Referring particularly to Figs. VII and VIII of the drawings, it will be seen that steam may issue from the ring by way of a great number of narrow, vertical slots 22. These several vertical slots 22 extend through the wall of the ring to form equal angles with the diameter of the ring, and are so arranged that their greatest area is found interiorly of the ring and their least area at the outer surface of the ring. The great number of these slots, and their small size, provides the separation of the steam into streams of the extremely minute proportions necessary in order to obtain contact between the steam and bath water of such intimacy as to effect an interchange of substantially the entire moisture content of the steam for moisture taken from the water of the bath. Because of their great number, and the fact that their greatest dimension lies interiorly of the ring, slots 22 do not tend to produce a wire-drawing effect in issuance of the steam through the ring.

It will be noted that the direction of the slots through the wall of the ring is such that the fine streams of steam issue from the ring tangentially to its outer surface, and that the inclination of the slots, to produce this tangential effect, is uni-directional throughout the entire annulus. For this reason, steam issuing from the distributing unit tends to move in a uni-directional, circular flow about the distributor, the direction of such flow either being clockwise or counterclockwise in accordance with the positioning of the ported ring 15 in one or the other of its reversible positions.

Thus, the direction of steam flow in Fig. VIII is shown as counterclockwise. If the position of the ported ring be reversed, the streams of steam issuing through the ported ring will be directed clockwise, rather than counterclockwise.

Advantage of this tendency to uni-directional flow, and the readily reversible mounting of the ported rings to reverse the direction of flow, is taken in the arrangement of distributing units in the bath stages in obtaining smooth and efficient functioning of the steam scrubber.

Referring particularly to Figs. IV and IVa of the drawings, showing scrubbing chambers B and C, steam issues into the water baths of the chambers through two longitudinally extending rows of steam-distributing units 10 at both sides of the longitudinally, central, imperforate region of partition wall or floor 7. The arrangement of the steam-distributing units is such that they project the steam in a predetermined manner which tends to cause movement of the bath water in definite directions. This tendency to create water movement in definite directions minimizes temperature variations in the bath and minimizes concentrations of solids which would in bath regions produce such ratio of bath-contained solids to steam-contained solids as would lead to lessened efficiency of the scrubber in furnishing steam substantially free from solid content. Baffles 23, interposed between adjacent steam-distributing units, cooperate in maintaining movement of the bath water in definite currents.

Baffles 23 are shown as of relatively short extent. The width of the baffles may, however, be increased where found desirable in the association in which the steam scrubber is to be used.

A vacuum effect causing water hammer would to some extent be produced by issuance of steam from the distributing units if it were not for the same directional flow of water and steam in the bath which the arrangement of the units provides. The movement of water, and the distribution of steam entry thereto, tends to produce a major and unopposed water movement so that water hammer is prevented and turbulence minimized.

Steam which has been washed in the scrubbing chamber B, by comminuted distribution in the bath water of that stage, rises from the water into a steam space overlying the bath, and underlying the partition wall or floor 8, which supports the bath of the steam-scrubbing chamber C. It may be here noted that, in normal operation of the apparatus, water for the steam-scrubbing bath B is received as drainage from the final scrubbing bath in chamber C through draw-off tubes 24, which lead through the partition wall or floor 8 along the sides of the drum, and which deliver water for the bath in scrubbing chamber B along the sides of the drum. Movement of the water in the scrubbing chamber B from the sides of the drum toward the longitudinal center of the drum is thus provided by delivery of the water supply along the drum sides. Draw-off tubes 24 have at their upper terminals V-shaped notches 24a similar to the V-shaped notches 13a in the draw-off tubes 13, and their discharge terminals empty into water seals 25, from which water overflows into the bath in scrubbing chamber B.

It will be noted, by reference to Fig. IVa of the drawings, that the draw-off tubes 24, by which water is delivered to the steam-scrubbing chamber B, are in line with transverse intervals in which the direction of steam delivery tends to cause water flow toward the longitudinal center of the scrubbing chamber. The water introduced into the chamber to form the bath therein thus flows in currents from the sides of the chamber adjacent the walls of the drum to discharge at the center line of the chamber.

The steam in the space overlying the bath in scrubbing chamber B passes through a second set of distributing units into the water bath of final scrubbing chamber C, the arrangement of which is specifically illustrated in Fig. IV of the drawings. In this latter scrubbing chamber, also, the steam-distributing units are arranged to deliver steam in a manner to maintain a water movement in definite directions throughout the bath. In this stage, also, baffles 23, between transversely adjacent distributing units, prevent such interference between streams or jets of steam from adjacent units as would tend to destroy the effect producing definitely directed currents maintaining the water of the bath in bodily movement.

Water-supply pipe 3 introduces water at the longitudinal, central line of the drum into a longitudinal channel formed of parallel, longitudinal walls 27 extended throughout the length of the drum. The walls 27 forming the channel have therein V notches 27a, which are arranged in line with those transverse intervals between the steam-distributing units in which the direction of steam delivery is such as to create water movement toward the sides of the drum. That is, the steam-distributing units produce movement in the same direction as that in which water tends to flow from the V notches.

The action of this scrubbing chamber is, therefore, that boiler feed water, supplied through pipe 3, passes in a current through a central, longitudinal channel provided by the parallel walls 27, and issuing at V notches 27a of the walls moves in currents toward the sides of the drum, adjacent which drum sides the bath water above a predetermined level enters draw-off pipes 24, and flows downwardly to provide bath water in scrubbing chamber B.

It should be borne in mind that, whereas chamber C is the final chamber insofar as steam scrubbing is concerned, it is the entry chamber for the water in which the steam is washed. As the water is introduced at a temperature substantially lower than the steam temperature, the useful life of the scrubber is substantially lengthened by so introducing the water that it does not exert on the drum walls a chilling effect such as would tend to set up stresses in the wall. This protection to the drum walls is additional to the advantageous effect of water flow in preventing water hammer, and undue turbulence.

Steam which has been comminuted in the bath water of scrubbing chamber C, and which has been washed by intimate contact therewith, upon issuing from this bath enters an overlying steam space from which it is delivered by way of outlet 5, leading to additional steam-treating apparatus or directly to work. In rising through steam space in the final scrubbing chamber C, the steam passes through a fine mesh screen 26, which is arranged between the water bath and outlet 5 in such position that the entire volume of steam rising from the bath passes through it in its travel to the outlet 5. This screen 26 tends further to disentrain moisture from the steam.

To describe generally the use of the apparatus, the boiler feed water entering the final scrubbing chamber C, containing, as it does, boiler condensate, or other prepared water, is in a state of relatively high purity, so that steam entering the bath in this stage, and interchanging moisture with the bath therein, is delivered with a minimized quantity of entrained solids. Water drawn off from final bath in the chamber C to the initial bath in the chamber B has a higher content of solids than the bath water in the chamber C, but contains a substantially lower concentration of solids than the steam which is washed in it.

It may here be noted that, as a preliminary to use of the scrubber, it is desirable to pass preheated boiler feed water, or other heated water, through it before steam is passed through the scrubber. This is in order that the scrubber and its contents may not initially be at a temperature so far below steam temperature as substantially to lower the latter, thus producing a violent water hammer by sudden condensation of a substantial volume of steam.

The effect is that the steam is first given full opportunity to interchange moisture, and solids entrained thereby, in the bath water of chamber B, which contains a lower concentration of solids than the entrained moisture of the steam. After this interchange, the comparatively purified steam, by being comminuted in the approximately pure water of final scrubbing chamber C, is in a condition in which injury to connections and equipment for conveying and utilizing the steam is negligible. The steam, by passage through screen 26 in the final scrubbing and steam-delivery chamber C, has its moisture content substantially reduced.

It has been noted that water drawn back from initial scrubbing chamber B, and which may contain by progressive concentration a higher solid content than that carried by the moisture of the steam, is drawn back into and through the steam-receiving chamber A out of contact with steam entering the scrubber. The water circulation in the scrubbing baths so distributes solids in the bath water as to minimize localized concentration of solids, and thus uniformly to purify the steam. Final draw-off or drain pipes 6 are made Venturi form in a region 6a adjacent their opening into the interior of the drum. This tends to create through these drain pipes a solid body of water from which steam is excluded, thus increasing the weight of the column of water passing to the boiler, and avoiding water hammer in the drain pipes due to condensation therein.

In order that the scrubber may be completely drained for cleaning and repairs, I provide a drain pipe 28, opening at the upper surface of the horizontal partition wall 8, and a drain pipe 29, opening at the upper level of the horizontal partition wall 7. These drain pipes connect with a drain line 40 which is common to both. This added drainage system also permits heated water, other than notably pure water, to be used in preheating the scrubber.

Covered manholes 30 and 31, opening respectively into final scrubbing chamber C and into initial scrubbing chamber B, permit the interior of the drum to be inspected, and give access to the interior of the drum for cleaning and repairs.

As to the question of repairs and replacement, it may be noted that some or all of the elements making up the steam-distributing units may be made of a suitable non-corrosive metal, such as Monel metal, stainless steel, or the like. Particularly the ported rings 15 of the steam distributors, which are the elements exposed to erosion by the steam, are included as separable elements which may readily be removed and replaced.

Taking into consideration the fact that many modern boiler installations are designed to deliver a great volume of steam at high temperature and attendant high pressure, removal of solids from the steam to an adequate extent presents problems of substantial difficulty. Thus it is necessary that the bath water be of substantial depth, that it be protected against a turbulence preventing intimate contact of the steam with it by a finely distributed introduction of the steam into it, and that the steam be finely distributed in the bath water. Uniformly high temperature throughout the scrubber is of importance, and it is of importance that the scrubber structure be protected from temperature differences. In order to effect adequate scrubbing it is also necessary that the final bath with which the steam comes in contact is of such purity throughout that substantial reduction in the solid content of the steam is effected by interchange of moisture with it. Also, it is a matter of primary importance to prevent, or minimize, water hammer in the scrubber during its operation, since severe water hammer in the scrubber not only detracts from the efficiency of its operation but also leads to a relatively rapid destruction of the scrubber structure by the vibrations thus set up.

Various changes may be made in the form and arrangement of the scrubber without departing from the spirit of my invention, or detracting from the efficiency of specialized features of the scrubber as herein illustrated and described. For example, the greater dimension of the scrubber drum may be vertical rather than horizontal. Also more than two scrubbing chambers may be provided, or merely one scrubbing chamber may be adequate, in accordance with the conditions under which the scrubber is used. The scrubber drum may, if desired, be so proportioned that the axes of each of the scrubbing chambers are substantially equal; or water may be introduced transversely rather than longitudinally of a final scrubbing chamber having the contour herein shown, and water movement may in such instance be caused longitudinally, rather than laterally, of the chamber.

I claim as my invention:

1. A steam scrubber comprising a drum having therein horizontal partitions dividing the drum into scrubbing chambers and a steam entry chamber and provided with means for conducting steam through the several chambers of the scrubber to discharge, draw-off means arranged to maintain a predetermined level of scrubbing water in each scrubbing chamber and to draw off water above such level to the chamber next below, means for introducing steam into said steam entry chamber out of contact with water drawn off into said chamber from the scrubbing chamber next thereabove, and moisture-detaining means interposed in the path of steam movement in the steam entry chamber.

2. In a steam scrubber the combination of a drum having therein at least one horizontal partition defining thereabove a scrubbing chamber and defining therebelow a steam-distributing space, means for supplying and means for defining the depth of a water bath in said scrubbing chamber, said water supplying and said depth defining means being arranged to produce a movement of bath water from the former toward the latter thereof, and steam-distributing units arranged in longitudinal rows along the sides of the scrubbing chamber and arranged tangentially to introduce comminuted streams of steam adjacent the bottom of the water bath, the said steam-distributing units being arranged directionally so to introduce the steam that the steam flow tends to cause water movement in well-defined currents.

3. A steam scrubber comprising the elements and arrangement of claim 2 and comprising additionally means interposed between adjacent steam-distributing units in position to intercept oppositely directed streams of steam therefrom being thereby contributory to the movement of the bath water in a plurality of well-defined currents.

4. A steam scrubber comprising a drum divided horizontally into scrubbing chambers arranged each to enclose a water bath for scrubbing steam, means for distributing steam in the water baths of said scrubbing chambers, means for supplying water to each chamber, and draw-off means in each chamber for drawing off water at a predetermined bath level, said water-supply means and said draw-off means being differently arranged in adjacent scrubbing chambers to provide alternately in the scrubbing chambers water movement from the sides toward the central region of the drum and movement from the central region of the drum toward the sides of the drum, the initial water supply being to a scrubbing chamber in which water movement is from the central region of the drum toward the drum sides.

5. A steam scrubber comprising a drum divided horizontally into scrubbing chambers arranged each to enclose a water bath for scrubbing steam, means for supplying water to each chamber, draw-off means in each chamber for drawing off water at a predetermined bath level, said water-supply means and said draw-off means being differently arranged in adjacent scrubbing chambers to provide alternately in the scrubbing chambers water movement from the sides toward a central region of the drum and movement from a central region toward the sides of the drum, and means for distributing steam in the baths of said scrubbing compartments in comminuted condition and directionally compatible with water movement from the water supply means to the draw-off means in each bath, the initial water supply being to a scrubbing chamber in which water movement is from the central region of the drum toward the drum sides.

6. A steam scrubber comprising the elements and arrangement of claim 5 and comprising additionally means interposed between adjacent steam-distributing units in position to intercept oppositely directed streams of steam therefrom being thereby contributory to the direction of water flow in a plurality of well-defined currents.

7. A steam scrubber comprising a drum having therein at least one partition defining a steam space therebelow and defining thereabove a steam-scrubbing chamber for containing a water bath, water supply means opening into said chamber at a central region thereof, draw-off means defining a bath depth adjacent the shell of the drum forming said chamber, and means for distributing in the water bath of the chamber steam in comminuted condition and directed along a line leading from the said water supply means to the said draw-off means.

8. A steam scrubber in accordance with the combination of claim 7 in which the draw-off means comprises at least one open tube having at its water-receiving terminal a V notch capable within its height of regulating the bath depth in accordance with variations in the volume of bath water supplied to the scrubbing chamber.

9. A steam-distributing unit for the introduction of steam in comminuted condition into the water of a steam-scrubbing bath comprising a dome forming the upper portion of the distributing unit, and an integral basal element in the form of a separable perforate ring adapted to fit the lower edge of the dome and to provide a wall supporting the dome, said perforate ring having therein a plurality of steam-delivery slots forming angles of substantially equal tangency with the periphery of the ring to project from the unit finely divided streams of steam issuing in a substantially uniform angular direction.

10. A steam scrubber comprising a drum divided horizontally into scrubbing chambers arranged each to enclose a water bath for scrubbing steam, means for supplying water to each chamber, draw-off means in each chamber for drawing off water at a predetermined bath level, said water supply means and said draw-off means being differently arranged in adjacent scrubbing chambers to provide alternately in the scrubbing chambers a general water movement from the sides toward a central region of the drum and movement from a central region toward the sides of the drum, and means for distributing steam in the baths of said scrubbing chambers in comminuted condition and so arranged as to promote water movement in a plurality of well-defined currents in general movement of the water from the water supply means to the draw-off means in each bath.

11. A steam scrubber comprising the elements and arrangements of claim 10, and comprising additionally means interposed between adjacent steam-distributing units in position to intercept oppositely directed streams of steam therefrom thereby to contribute to water movement in a plurality of well-defined currents.

12. A steam scrubber comprising a drum divided horizontally into scrubbing chambers arranged each to enclose a water bath for scrubbing steam, means for supplying water to each chamber, draw-off means in each chamber for drawing off water at a predetermined bath level, said water supply means and said draw-off means being differently arranged in adjacent scrubbing chambers to provide alternately in the scrubbing chamber a general water movement from the sides toward the central region of the drum and movement from a central region toward the sides of the drum, and means for distributing steam in the baths of said scrubbing chambers in comminuted condition and so arranged as to promote water movement in a plurality of well-defined currents in general movement of the water from the water supply means to the draw-off means in each bath.

13. A steam distributing unit for the introduction of steam in comminuted condition into the water of a steam scrubbing bath comprising a dome forming the upper portion of the distributing unit, and an integral basal element in the form of a separable and reversible perforate ring adapted to fit the lower edge of the dome and to provide a wall supporting the dome, said reversible perforate ring having therein a plurality of steam delivery slots forming angles of substantially equal tangency with the periphery of the ring to project from the unit finely divided streams of steam issuing in a substantially uniform angular direction.

14. The herein described method of scrubbing steam which comprises maintaining in the scrubber drum and in substantially predetermined depth a bath of water having a solid content substantially lower than that in the moisture content of the steam to be scrubbed, maintaining such ratio of solid content in the water and the steam by continuously supplying fresh water to the drum and draining water therefrom at a predetermined bath level, and effecting interchange of solid content between the moisture of the steam and the bath water by introducing steam in comminuted condition into the bath in streams cooperatively directed to cause movement of the bath water in a plurality of well-defined currents.

15. The herein described method of scrubbing steam in accordance with the procedure of claim 14, in which fresh bath water is introduced in a central region of the bath and out of direct initial contact with steam comminuted in the bath.

CYRUS WM. RICE.